(12) United States Patent
Kaneda (10) Patent No.: US 11,776,773 B2
(45) Date of Patent: Oct. 3, 2023

(54) RELEASE SWITCH DEVICE AND IMAGING APPARATUS

(71) Applicant: Panasonic Intellectual Property Management Co., Ltd., Osaka (JP)

(72) Inventor: Norikazu Kaneda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/902,806

(22) Filed: Sep. 3, 2022

(65) Prior Publication Data

US 2023/0081836 A1 Mar. 16, 2023

(30) Foreign Application Priority Data

Sep. 10, 2021 (JP) ................. 2021-148007

(51) Int. Cl.
| | |
|---|---|
| *H01H 13/14* | (2006.01) |
| *H01H 13/22* | (2006.01) |
| *G01L 1/20* | (2006.01) |
| *G03B 13/36* | (2021.01) |

(52) U.S. Cl.
CPC ............ *H01H 13/14* (2013.01); *G01L 1/20* (2013.01); *G03B 13/36* (2013.01); *H01H 13/22* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 9,364,749 B2 * | 6/2016 | Yamagishi | ............... | A63F 13/24 |
| 2010/0277295 A1 * | 11/2010 | Matthews | ........... | F21V 23/0421 |
| | | | | 340/332 |
| 2014/0252881 A1 * | 9/2014 | Dinh | ..................... | H01H 13/06 |
| | | | | 29/622 |

FOREIGN PATENT DOCUMENTS

| | | |
|---|---|---|
| JP | 2004-157353 A | 6/2004 |
| JP | 2004-206178 A | 7/2004 |
| JP | 2012-185249 A | 9/2012 |
| JP | 2014-021408 A | 2/2014 |

(Continued)

*Primary Examiner* — Ahmed M Saeed
(74) *Attorney, Agent, or Firm* — Renner, Otto, Boisselle & Sklar, LLP (57) ABSTRACT

A release switch device includes: a button; a first elastic member to be pressed and displaced by the button; a pressure-sensitive sensor to face the first elastic member at an interval, to be pressed and displaced by the button with interposition of the first elastic member, when the button is displaced exceeding a predetermined stroke amount; and a second elastic member to be pressed and displaced by the button with interposition of the first elastic member and the pressure-sensitive sensor. When the button is displaced by a first stroke amount equal to or larger than the predetermined stroke amount, the pressure-sensitive sensor receives a first repulsive force of the second elastic member and outputs a first output value. When the button is displaced by a second stroke amount larger than the first stroke amount, the pressure-sensitive sensor receives a second repulsive force larger than the first repulsive force of the second elastic member and outputs a second output value.

6 Claims, 13 Drawing Sheets

(56) References Cited

FOREIGN PATENT DOCUMENTS

| JP | 2015-076177 A | 4/2015 |
| JP | 2019-148632 A | 9/2019 |

* cited by examiner

RELEASE SWITCH DEVICE AND IMAGING APPARATUS

BACKGROUND OF THE INVENTION

Field of the Invention

The present disclosure relates to a release switch device and an imaging apparatus including the release switch device.

Description of the Related Art

For example, JP 2015-76177 A discloses a switch unit incorporated in an imaging apparatus. The switch unit includes a button to be pressed by a user, and a plurality of electrical segments in a cantilever shape brought into a first conduction state by displacement of a first stroke amount of the button and into a second conduction state by displacement of a second stroke amount. When the plurality of electrical segments are brought into the first conduction state, the autofocus operation for focusing the subject is executed, and when the plurality of electrical segments are brought into the second conduction state, the imaging element executes the imaging operation.

SUMMARY OF THE INVENTION

Incidentally, users of the imaging apparatus have a demand for adjusting a stroke amount of a button necessary for executing an autofocus operation and a stroke amount of a button necessary for executing an imaging operation. However, in the case of the switch unit of the imaging apparatus described in JP 2015-76177 A, the stroke amount necessary for execution of the autofocus operation and the imaging operation cannot be easily adjusted.

Thus, an object of the present disclosure is to provide a release switch device used in an imaging apparatus, including a button pressed and displaced by a user, and allowing the user to easily adjust a stroke amount of a button necessary for executing various operations.

In order to solve the above problem, according to one aspect of the present disclosure, provided is a release switch device including: a button configured to be pressed and displaced by a user; a first elastic member including a first displacement portion configured to be pressed and displaced by the button; a pressure-sensitive sensor configured to face the first displacement portion of the first elastic member at an interval, the pressure-sensitive sensor configured to be pressed and displaced by the button with interposition of the first elastic member, when the button is displaced exceeding a predetermined stroke amount; and a second elastic member including a second displacement portion configured to be pressed and displaced by the button with interposition of the first elastic member and the pressure-sensitive sensor. When the button is displaced by a first stroke amount equal to or larger than the predetermined stroke amount, the pressure-sensitive sensor receives a first repulsive force from the second elastic member and outputs a first output value. When the button is displaced by a second stroke amount larger than the first stroke amount, the pressure-sensitive sensor receives a second repulsive force larger than the first repulsive force from the second elastic member and outputs a second output value.

In addition, according to another aspect of the present disclosure, provided is an imaging apparatus including: the above-described release switch device; a lens; an imaging element on which an image of a subject transmitted through the lens is formed; and an AF mechanism configured to drive the lens in an optical axis direction to focus a subject on the imaging element. The AF mechanism executes an autofocus operation of focusing a subject on the imaging element with the first output value of the pressure-sensitive sensor as a trigger. The imaging element executes an imaging operation of creating image data on a subject with the second output value of the pressure-sensitive sensor as a trigger.

According to the present disclosure, a release switch device used in an imaging apparatus, including a button pressed and displaced by a user, and allowing the user to easily adjust a stroke amount of a button necessary for executing various operations can be provided.

DESCRIPTION OF THE PREFERRED EMBODIMENTS

Hereinafter, embodiments will be described in detail with reference to the drawings as appropriate. However, a detailed description more than necessary may be omitted. For example, a detailed description of already well-known matters and a redundant description for substantially the same configuration may be omitted. This is to avoid the unnecessary redundancy of the following description and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims.

Hereinafter, a release switch device and an imaging apparatus according to embodiments of the present disclosure will be described with reference to the drawings.

Figure 1:
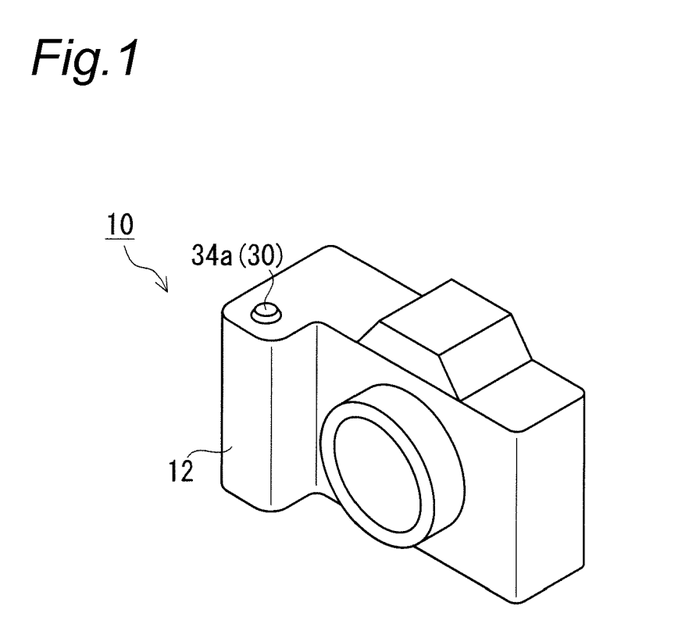
FIG. 1 is a schematic front perspective view of an imaging apparatus according to an embodiment of the present disclosure.
Figure 2:
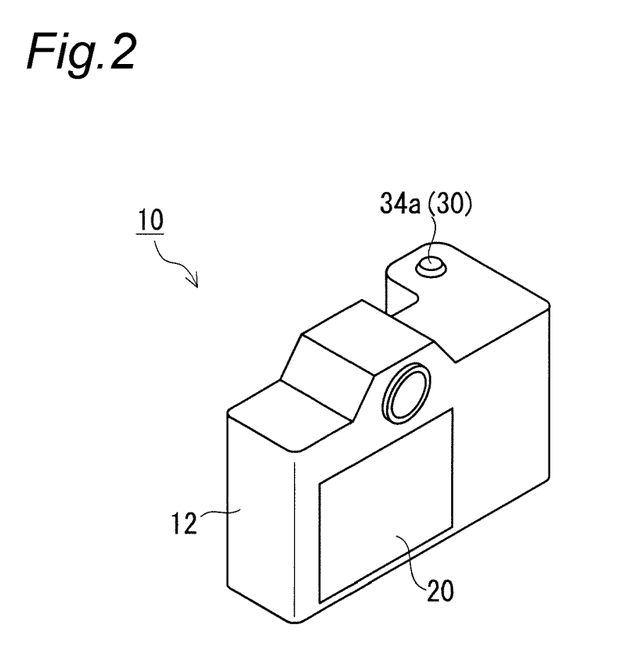
FIG. 2 is a schematic rear perspective view of the imaging apparatus.

FIG. 1 is a schematic front perspective view of an imaging apparatus according to an embodiment of the present disclosure. In addition, FIG. 2 is a schematic rear perspective view of the imaging apparatus. Furthermore, FIG. 3 is a diagram schematically showing a configuration of the imaging apparatus.

Figure 3:
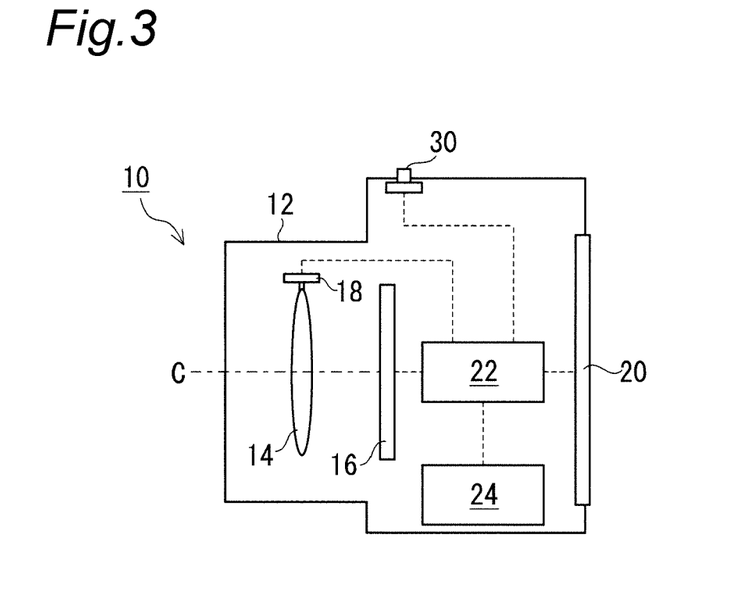
FIG. 3 is a diagram schematically showing a configuration of the imaging apparatus.

As shown in FIGS. 1 to 3, in the case of the present embodiment, the imaging apparatus 10 includes a casing 12. The casing 12 includes a lens 14 through which an image of a subject is transmitted, an imaging element 16 on which the image of the subject transmitted through the lens 14 is formed, an AF mechanism 18 that drives the lens 14 in an optical axis direction C of the imaging apparatus 10 to focus the subject on the imaging element 16, a touch screen 20 as a user interface unit, a controller 22 that controls the imaging element 16, the AF (Auto Focus) mechanism 18, and the touch screen 20, and a storage device 24.

The lens 14 is an optical element that projects an image of a subject toward the imaging element 16. It should be noted that the number of the lenses 14 is not limited to one, and may be plural.

The imaging element 16 is a photoelectric conversion device such as a CCD or a CMOS, and creates image data of a subject from an image of the subject formed by the lens 14 as an imaging operation, under the control of the controller 22.

The AF mechanism 18 is an actuator that drives the lens 14, and drives the lens 14 in the optical axis direction C to focus the subject on the imaging element 16 as an autofocus operation, under the control of the controller 22.

The touch screen 20 is a display device in which a touch panel is disposed to be superposed on a display screen of a display monitor. The touch panel is one user interface unit in the imaging apparatus 10, and the display monitor displays an image or the like created by the imaging element 16 under the control of the controller 22. In addition, the touch screen 20 displays parameters set by the user, touch buttons, and the like.

The controller 22 is a processor such as a CPU that operates according to a program stored in the storage device 24, and controls the imaging element 16, the AF mechanism 18, and the touch screen 20.

The storage device 24 is, for example, a ROM or a RAM that stores a program, a card type storage medium that stores an image created by the imaging element 16, or the like.

In addition, the imaging apparatus 10 includes a release switch device 30.

Figure 4:
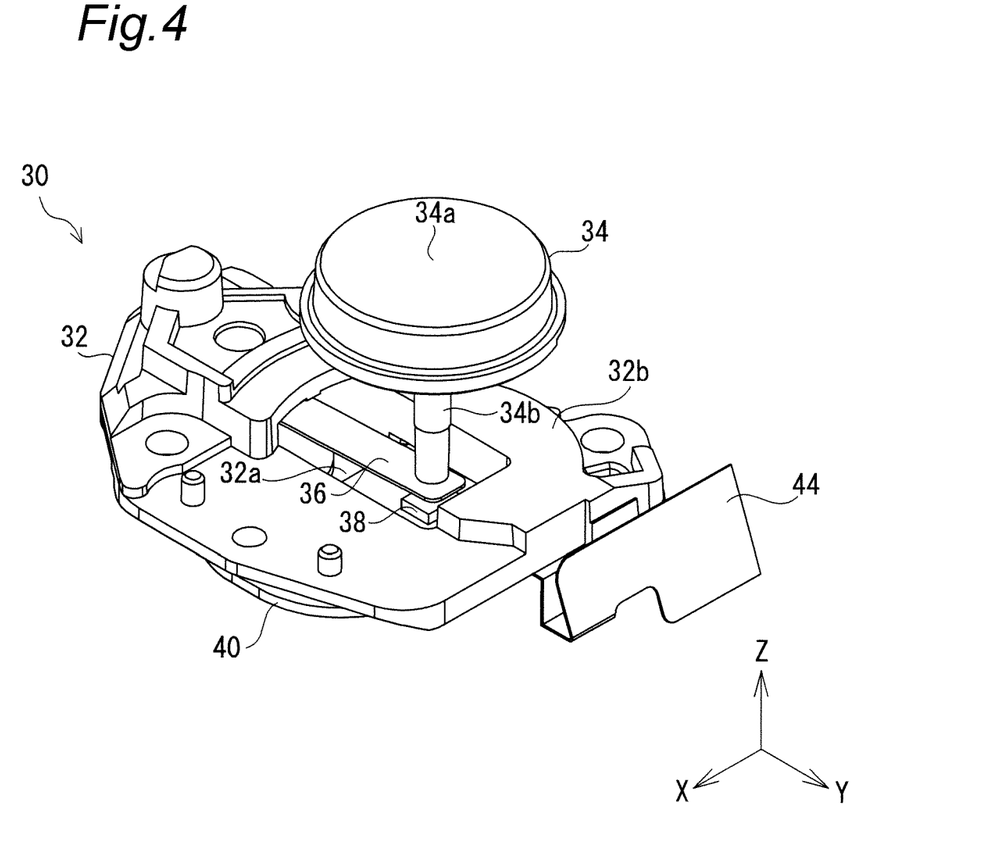
FIG. 4 is an upper perspective view of a release switch device.
Figure 5:
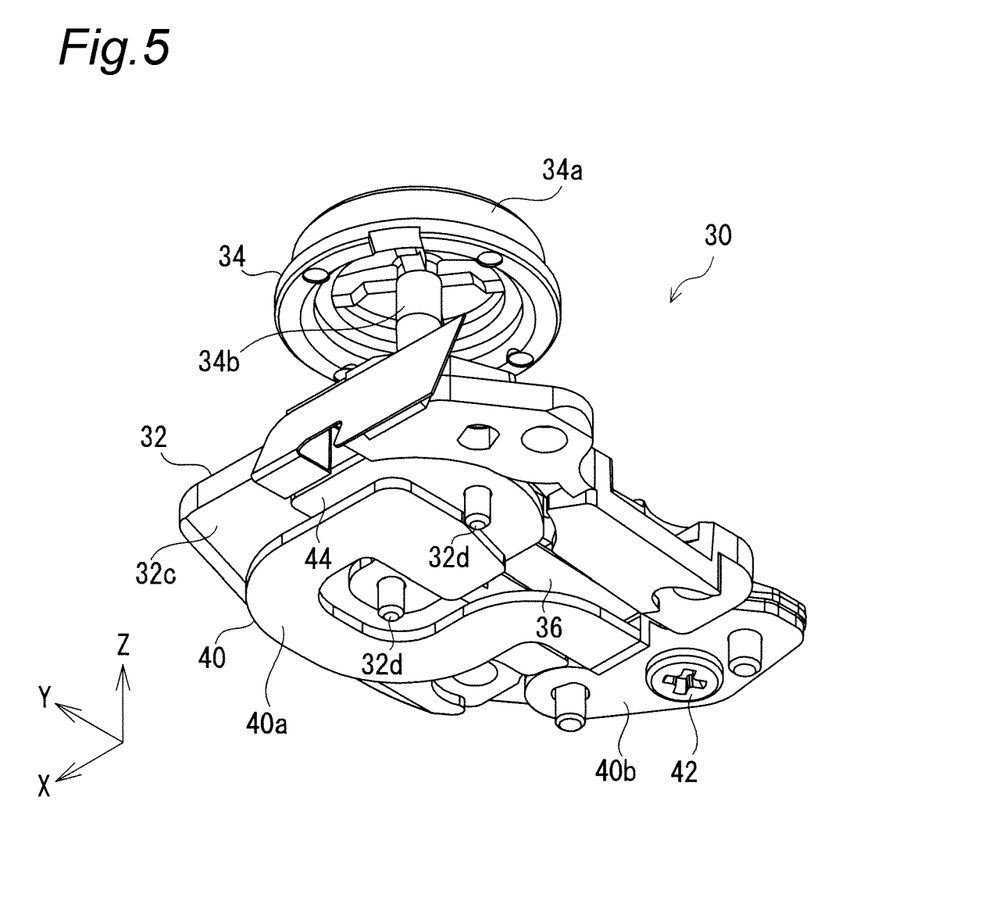
FIG. 5 is a lower perspective view of the release switch device.
Figure 6:
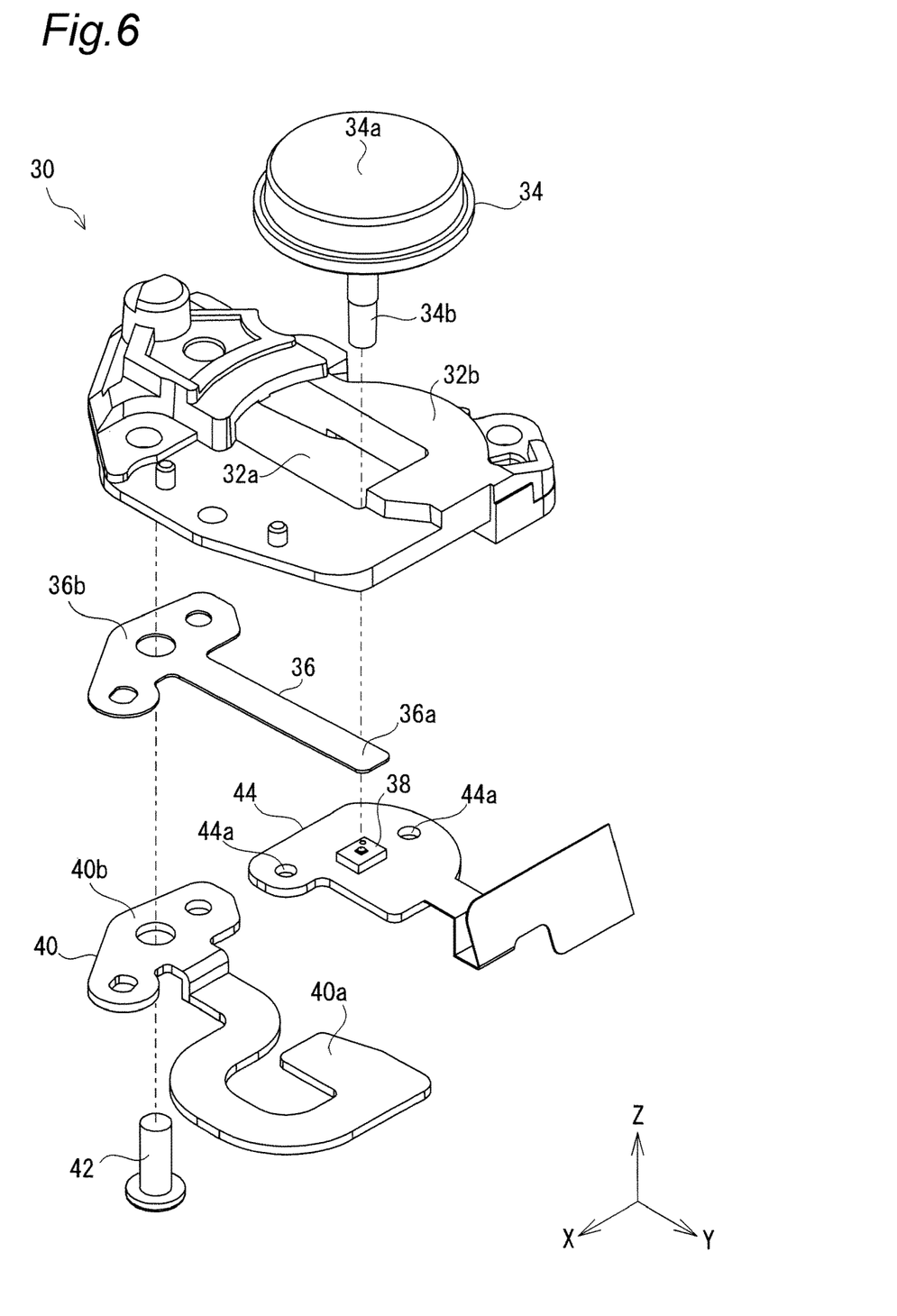
FIG. 6 is an upper exploded perspective view of the release switch device.
Figure 7:
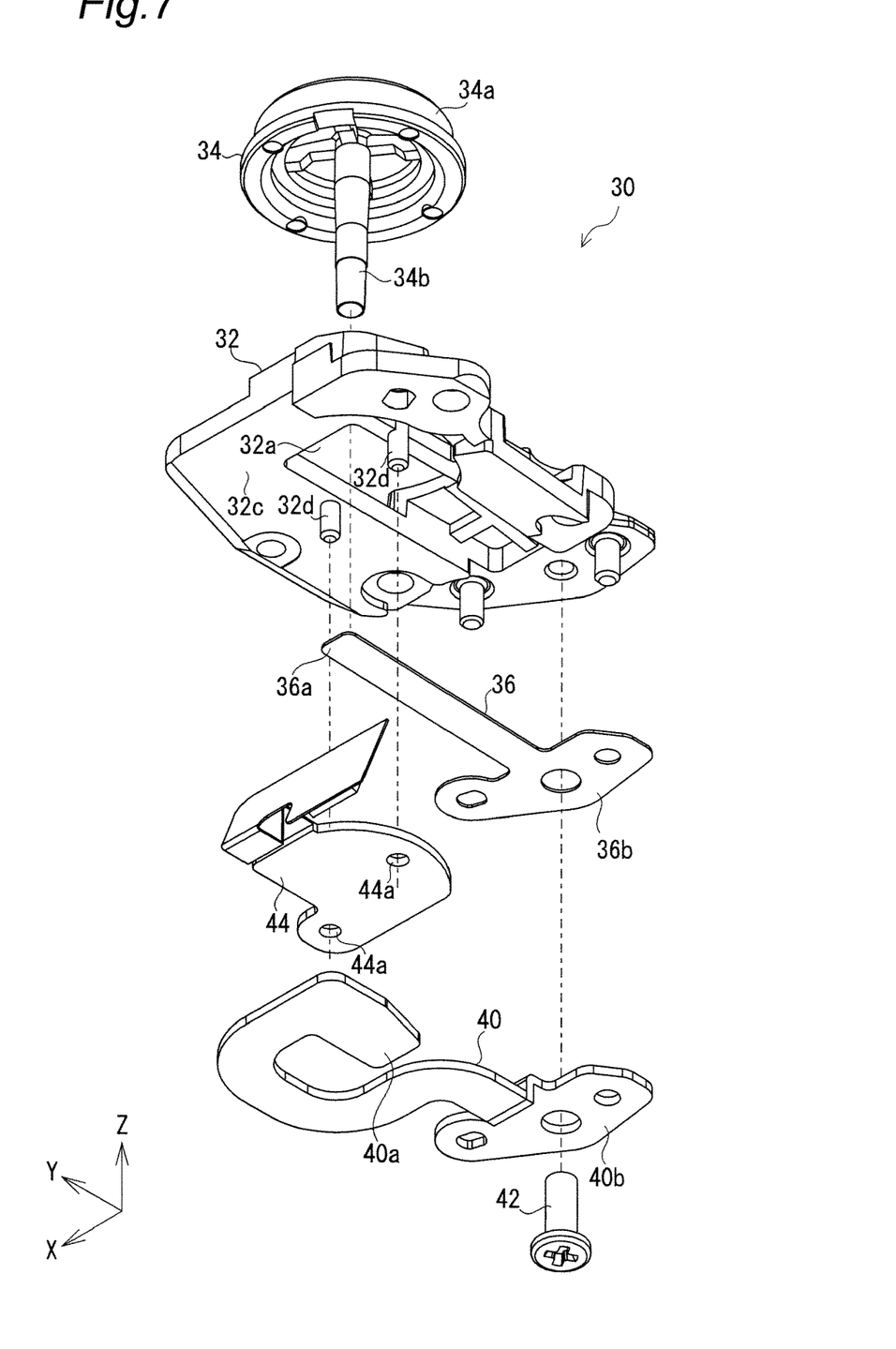
FIG. 7 is a lower exploded perspective view of the release switch device.
Figure 8:
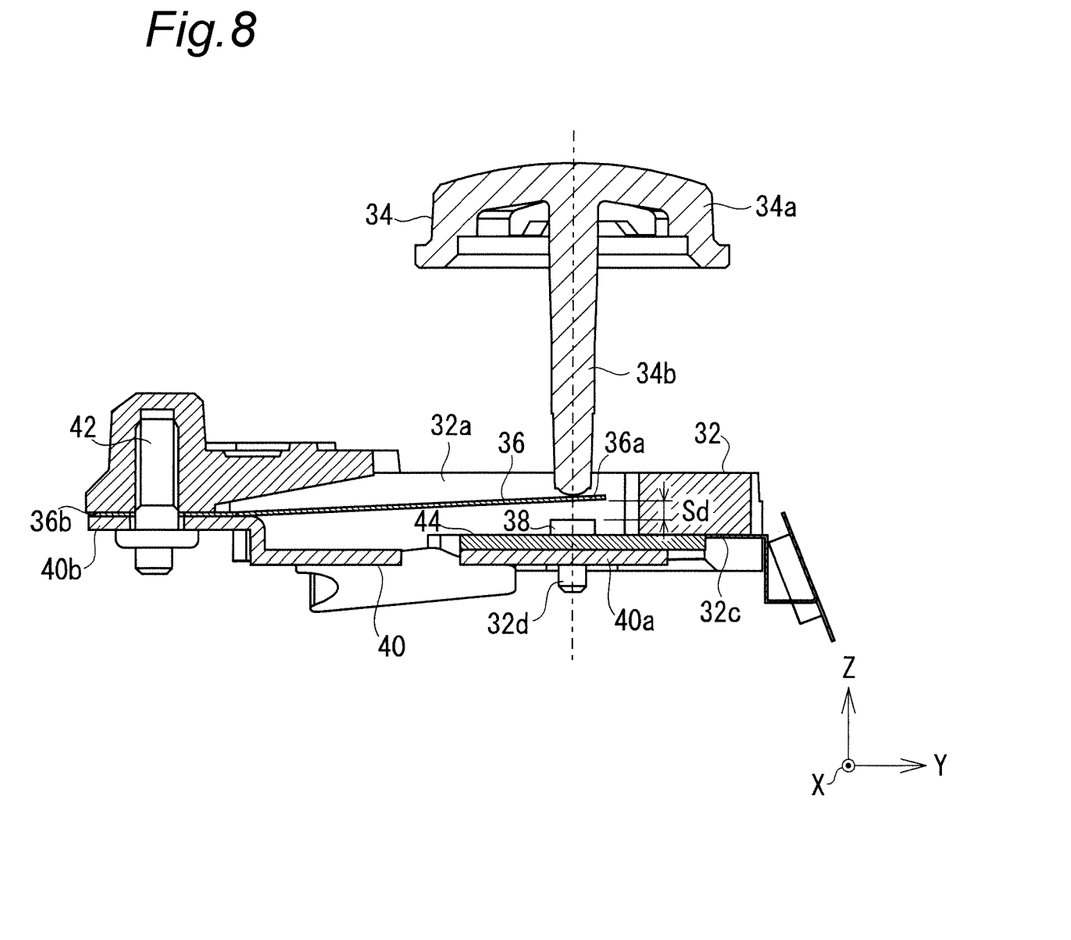
FIG. 8 is a cross-sectional view of the release switch device in an initial state.

FIG. 4 is an upper perspective view of the release switch device. In addition, FIG. 5 is a lower perspective view of the release switch device. Furthermore, FIG. 6 is an upper exploded perspective view of the release switch device. Furthermore, FIG. 7 is a lower exploded perspective view of the release switch device. Then, FIG. 8 is a cross-sectional view of the release switch device in an initial state. It should be noted that the X-Y-Z orthogonal coordinate system illustrated in the drawings is for assisting understanding of the embodiment of the present disclosure, and does not limit the embodiment. The Z-axis direction is a displacement direction of a button to be described below, and the X-axis direction and the Y-axis direction are directions orthogonal to the displacement direction.

The release switch device 30 shown in FIGS. 4 to 8 is provided in the casing 12 of the imaging apparatus 10 as shown in FIGS. 1 and 2. The release switch device 30 is an input device for the user to instruct the imaging apparatus 10 to execute an autofocus operation and an imaging operation.

As shown in FIGS. 4 to 8, the release switch device 30 includes a base member 32, a button 34, a first elastic member 36, a pressure-sensitive sensor 38, and a second elastic member 40.

The base member 32 of the release switch device 30 is attached to the casing 12 of the imaging apparatus 10. In addition, the base member 32 includes a through hole 32a.

The button 34 is a member displaced by receiving an external force, that is, a member pressed and displaced by the user, and is disposed on the first surface 32b side of the base member 32. In the case of the present embodiment, the button 34 is supported not by the base member 32 but by the casing 12 so as to be freely displaceable within a predetermined stroke range. The button 34 also includes a head portion 34a that receives a pressing force and a shaft portion 34b that extends from the head portion 34a in the displacement direction (Z-axis direction) of the button 34 and enters the through hole 32a of the base member 32.

The first elastic member 36 is an elastically deformable member, and is, for example, a leaf spring made of a metal material in the case of the present embodiment. The first elastic member 36 being a leaf spring includes a displaceable free end 36a (first displacement portion) and a fixed end 36b fixed to the base member 32. The fixed end 36b is fixed to the second surface 32c (a surface opposite to the first surface 32b) of the base member 32 with interposition of a fixing screw 42.

As shown in FIG. 8, the free end 36a of the first elastic member 36 faces the tip of the shaft portion 34b of the button 34 in the displacement direction (Z-axis direction) of the button 34. In the case of the present embodiment, as shown in FIG. 8, when the release switch device 30 is in the initial state in which no external force acts on the button 34, the free end 36a of the first elastic member 36 is in contact with the tip of the shaft portion 34b of the button 34. When a pressing force acts on the button 34, the free end 36a of the first elastic member 36 is pressed and displaced by the button 34.

The pressure-sensitive sensor 38 is a sensor that outputs an output value (voltage value) corresponding to the magnitude of the pressing force acting on itself, and is provided on the base member 32 so as to be freely displaceable in the displacement direction (Z-axis direction) of the button 34. In the case of the present embodiment, the pressure-sensitive sensor 38 is mounted on the flexible printed circuit board 44, and the flexible printed circuit board 44 is supported by the base member 32 so as to be freely displaceable.

It should be noted that although the reason will be described below, the pressure-sensitive sensor 38, that is, the flexible printed circuit board 44 is guided by the guide member 32d provided on the base member 32 so as to move in parallel in the displacement direction (Z-axis direction) of the button 34. In the case of the present embodiment, the guide member 32d is a plurality of guide pins, and a plurality of guide holes 44a into which the plurality of guide pins are slidably inserted are formed in the flexible printed circuit board 44. That is, the pressure-sensitive sensor 38 is indirectly guided by the guide member 32d.

As shown in FIG. 8, the pressure-sensitive sensor 38 faces the tip of the shaft portion 34b of the button 34 in the displacement direction (Z-axis direction) of the button 34 with interposition of the first elastic member 36. In addition, when the release switch device 30 is in the initial state, the pressure-sensitive sensor 38 faces the free end 36a of the first elastic member 36 at an interval. That is, the free end 36a of the first elastic member 36 comes into contact with the pressure-sensitive sensor 38 when being pressed by the button 34 and displaced by the predetermined stroke amount Sd. When the button 34 (that is, the free end 36a) is displaced by a stroke amount exceeding the predetermined stroke amount Sd, the pressure-sensitive sensor 38, that is, the flexible printed circuit board 44 is displaced by being pressed by the free end 36a.

The second elastic member 40 is an elastically deformable member, and is, for example, a leaf spring made of a metal material in the case of the present embodiment. The second elastic member 40 being a leaf spring includes a displaceable free end 40a (second displacement portion) and a fixed end 40b fixed to the base member 32. The fixed end 40b is fixed to the second surface 32c of the base member 32 with interposition of the fixing screw 42 and in a state of overlapping with the fixed end 36b of the first elastic member 36.

The free end 40a of the second elastic member 40 faces, in the displacement direction (Z-axis direction) of the button 34, the tip of the shaft portion 34b of the button 34 with interposition of the first elastic member 36 and the pressure-sensitive sensor 38 (that is, the flexible printed circuit board 44). In the case of the present embodiment, as shown in FIG. 8, the free end 40a of the second elastic member 40 supports the flexible printed circuit board 44. As will be described in detail below, when the pressure-sensitive sensor 38 is displaced, the free end 40a of the second elastic member 40 is displaced accordingly.

It should be noted that in the case of the present embodiment, when the release switch device 30 is in the initial state, the free end 40a of the second elastic member 40 urges the flexible printed circuit board 44 and presses the flexible printed circuit board 44 against the second surface 32c of the base member 32 so that the flexible printed circuit board 44 is not freely displaced. That is, the second surface 32c functions as a stopper member that limits displacement of the pressure-sensitive sensor 38 toward the first elastic member 36. Thus, the flexible printed circuit board 44 is prevented from vibrating while the user moves holding the imaging apparatus 10.

In addition, in the case of the present embodiment, as shown in FIGS. 6 and 7, the second elastic member 40 is a spiral leaf spring, and the free end 40a is a center side end and the fixed end 40b is an outer peripheral side end. The free end of the spiral leaf spring can move in parallel without greatly inclining the attitude as compared with the free end of a linear leaf spring. As a result, the free end 40a of the second elastic member 40 can assist the parallel movement of the pressure-sensitive sensor 38, that is, the flexible printed circuit board 44.

Hereinafter, the operation of the release switch device 30 will be described with reference to FIGS. 9A to 9C and 10.

Figure 9A:
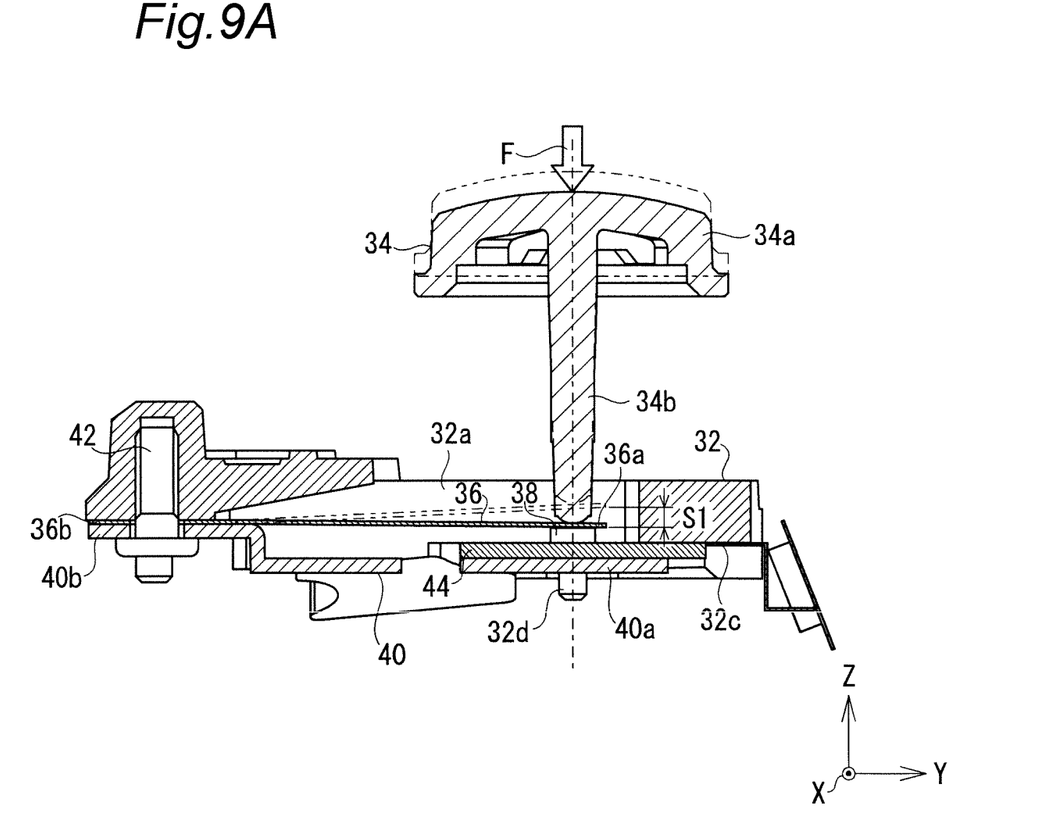
FIG. 9A is a cross-sectional view of the release switch device in a state where the button is displaced by a first stroke amount.
Figure 9B:
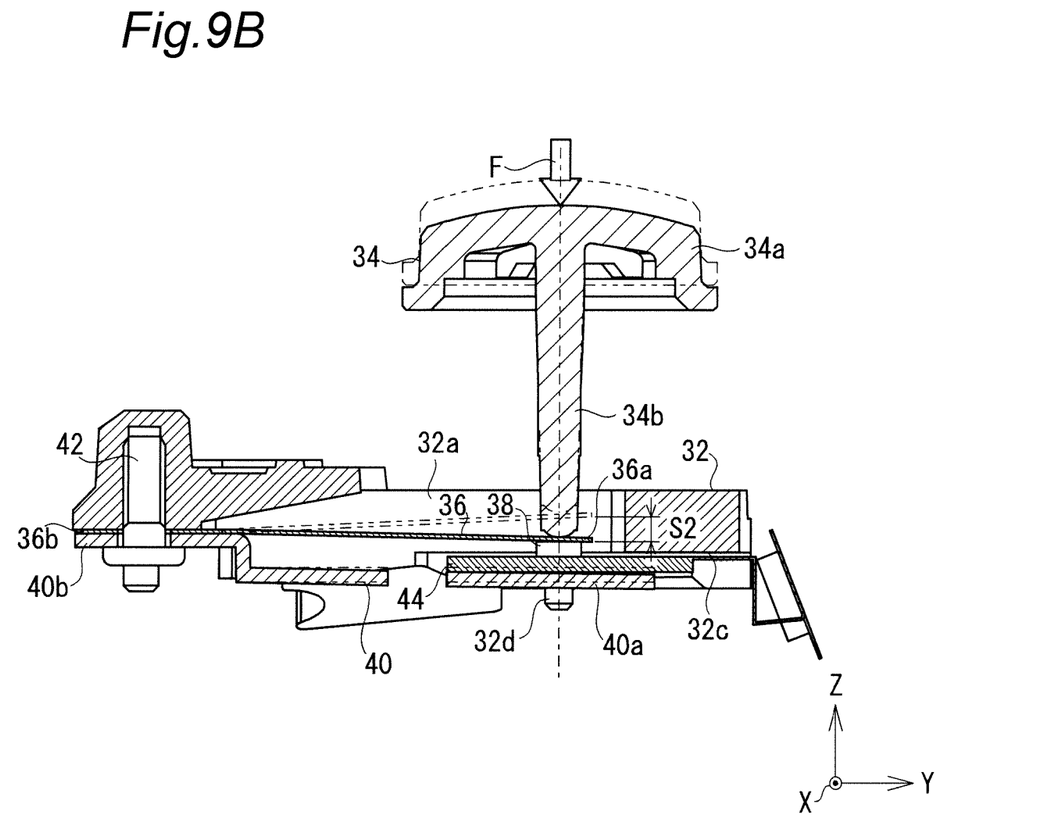
FIG. 9B is a cross-sectional view of the release switch device in a state where the button is displaced by a second stroke amount larger than the first stroke amount.
Figure 9C:
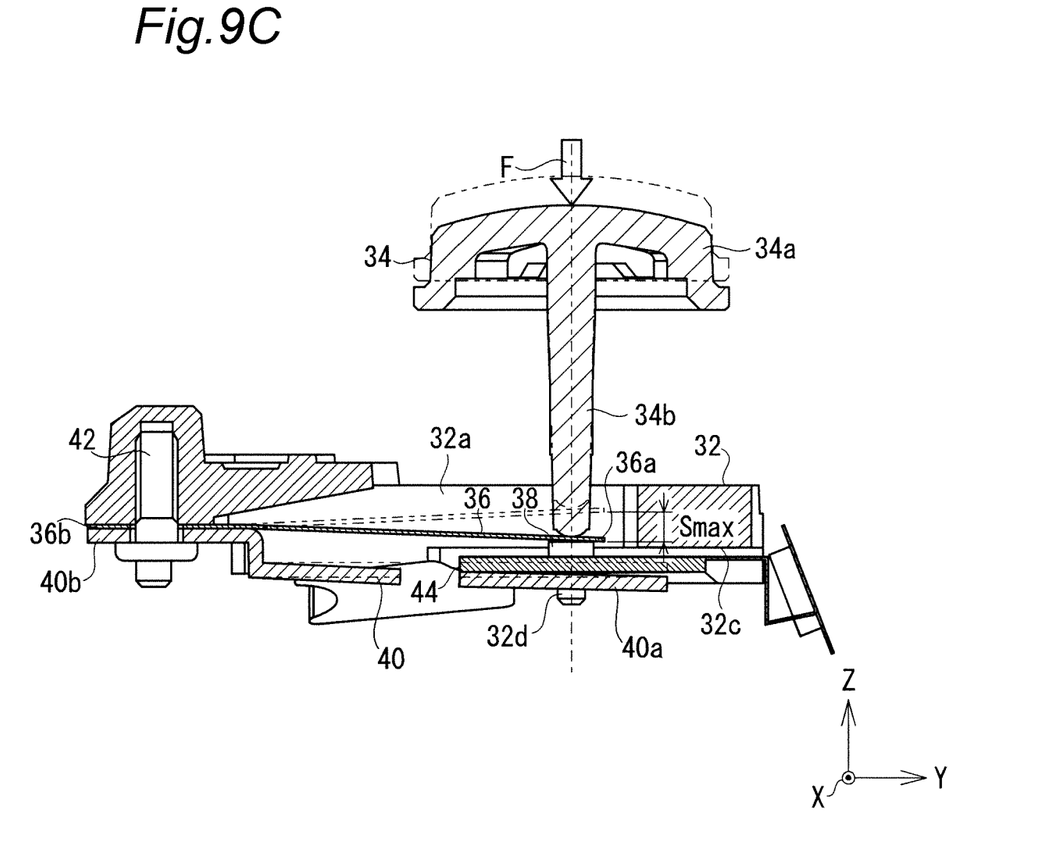
FIG. 9C is a cross-sectional view of the release switch device in a state where the button is displaced by a stroke amount larger than the second stroke amount.
Figure 10:
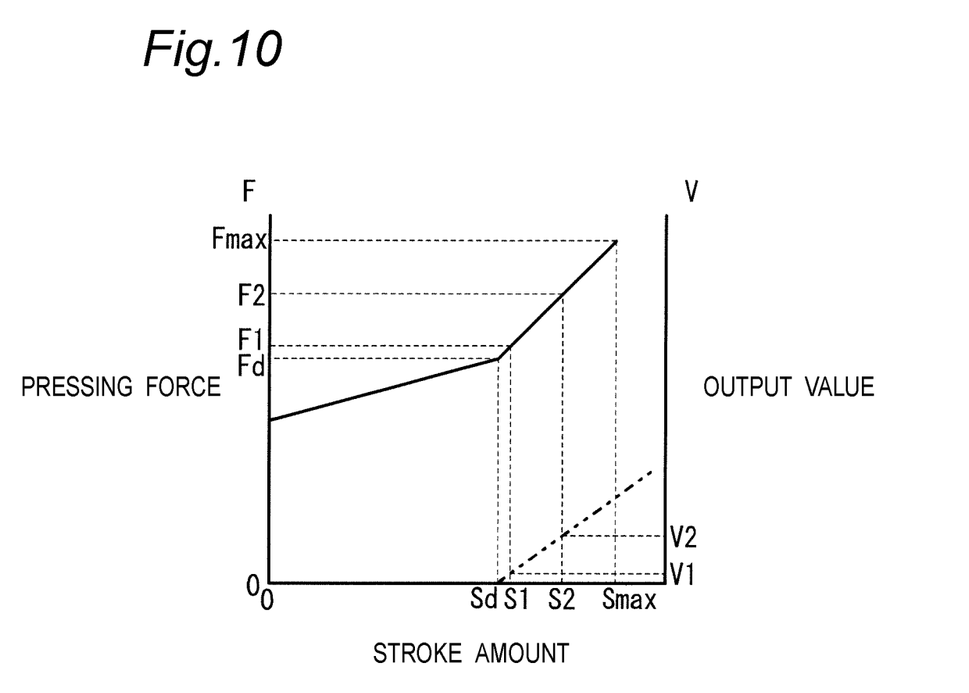
FIG. 10 is a diagram showing a change in the pressing force acting on the button and a change in the output value of the pressure-sensitive sensor with respect to a change in the stroke amount of the button.

FIG. 9A is a cross-sectional view of the release switch device in a state where the button is displaced by a first stroke amount. In addition, FIG. 9B is a cross-sectional view of the release switch device in a state where the button is displaced by a second stroke amount larger than the first stroke amount. Furthermore, FIG. 9C is a cross-sectional view of the release switch device in a state where the button is displaced by a stroke amount larger than the second stroke amount. Then, FIG. 10 is a diagram showing a change in the pressing force acting on the button and a change in the output value of the pressure-sensitive sensor with respect to a change in the stroke amount of the button. It should be noted that in FIGS. 9A to 9C, the button 34, the first elastic member 36, and the second elastic member 40 in the initial state are indicated by two-dot chain lines.

First, when the user presses the button 34 with the pressing force F, the stroke amount of the button 34 increases as the pressing force F increases as shown in FIG. 10. Until the stroke amount of the button 34 reaches the predetermined stroke amount Sd, that is, until the free end 36a of the first elastic member 36 comes into contact with the pressure-sensitive sensor 38, the button 34 receives only the repulsive force of the first elastic member 36. In addition, meanwhile, the pressure-sensitive sensor 38 outputs an output value of zero.

When the pressing force F of the user increases to F1 as shown in FIG. 10, the button 34 is displaced by a first stroke amount S1 equal to or larger than the predetermined stroke amount Sd as shown in FIG. 9A. Thus, the free end 36a of the first elastic member 36 presses the pressure-sensitive sensor 38, and the pressure-sensitive sensor 38 is displaced. That is, the pressure-sensitive sensor 38 is pressed by the button 34 with interposition of the first elastic member 36, thereby being displaced.

The displacement of the pressure-sensitive sensor 38, that is, the displacement of the flexible printed circuit board 44 displaces the free end 40a of the second elastic member 40. That is, the free end 40a of the second elastic member 40 is pressed by the button 34 with interposition of the first elastic member 36 and the pressure-sensitive sensor 38, thereby being displaced.

The displacement of the free end 40a of the second elastic member 40 causes the second elastic member 40 to generate a first repulsive force that urges the pressure-sensitive sensor 38 toward the free end 36a of the first elastic member 36. As a result, as shown in FIG. 10, the pressure-sensitive sensor 38 detects the pressing force corresponding to the first repulsive force, and outputs the corresponding first output value V1 to the controller 22 of the imaging apparatus 10. The controller 22 controls the AF mechanism 18 based on the first output value V1. The AF mechanism 18 executes an autofocus operation of driving the lens 14 to focus the subject on the imaging element 16 under the control of the controller 22. That is, the AF mechanism 18 executes the autofocus operation with the first output value V1 as a trigger.

When the pressing force F of the user further increases to F2 as shown in FIG. 10, the button 34 is displaced by a second stroke amount S2 larger than the first stroke amount S1 as shown in FIG. 9B. Thus, the free end 36a of the first elastic member 36 further presses the pressure-sensitive sensor 38, and the pressure-sensitive sensor 38 is further displaced. Further displacement of the pressure-sensitive sensor 38 further displaces the free end 40a of the second elastic member 40.

The further displacement of the free end 40a of the second elastic member 40 causes the second elastic member 40 to generate a second repulsive force larger than the first repulsive force, the second repulsive force further urging the pressure-sensitive sensor 38 toward the free end 36a of the first elastic member 36. As a result, as shown in FIG. 10, the pressure-sensitive sensor 38 detects the pressing force corresponding to the second repulsive force, and outputs the corresponding second output value V2 to the controller 22 of the imaging apparatus 10. The controller 22 controls the imaging element 16 based on the second output value V2. The imaging element 16 executes an imaging operation of creating image data on a subject under the control of the controller 22. That is, the imaging element 16 executes the imaging operation with the second output value V2 as a trigger.

As shown in FIG. 10, when the pressing force F of the user further increases from F2, the button 34 is displaced by a stroke amount larger than the second stroke amount S2 as shown in FIG. 9C. It should be noted that FIG. 9C shows a state in which the button 34 is displaced by the maximum stroke amount Smax.

According to the release switch device 30 capable of executing such an operation, the user can easily adjust the first stroke amount S1 of the button 34 necessary for the autofocus operation and the second stroke amount S2 necessary for the imaging operation within the range from the predetermined stroke amount Sd to the maximum stroke amount Smax.

Figure 11:
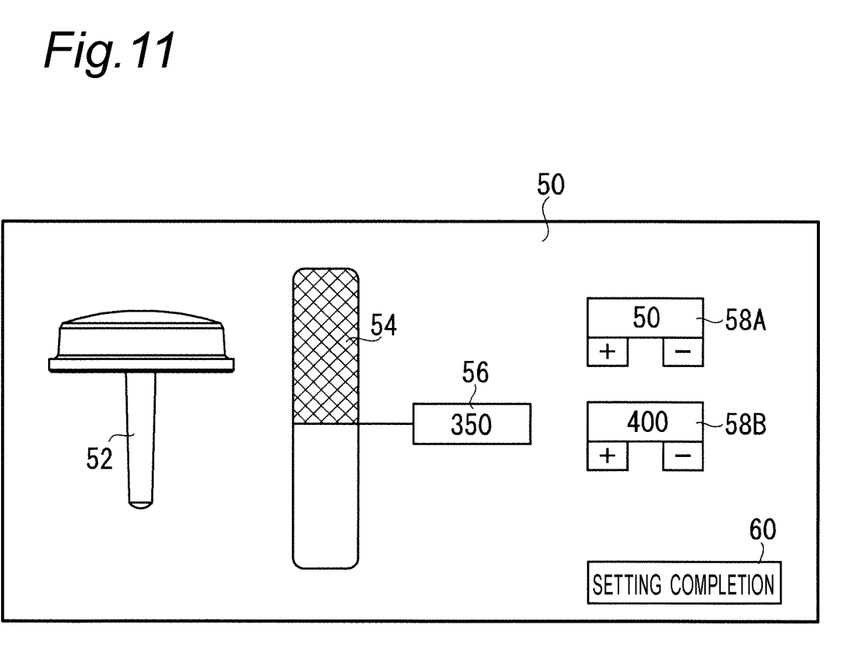
FIG. 11 is a diagram showing a setting screen of an example for the user to set the first stroke amount and the second stroke amount.

FIG. 11 is a diagram showing a setting screen of an example for the user to set the first stroke amount and the second stroke amount.

As shown in FIG. 11, when the user performs a predetermined operation on the touch screen 20, the controller 22 displays a stroke amount setting screen 50 on the touch screen 20. On the stroke amount setting screen 50, an image 52 of a button 34 that shifts downward is displayed when the user presses the button 34. In addition, an indicator bar 54 and an indicator box 56 indicating the current stroke amount of the button 34 are displayed. When the user presses the button 34, the bar length of the indicator bar 54 and the numerical value of the indicator box 56 change. Thus, the user can know the stroke amount of the button 34 in the pressed state.

In addition, the stroke amount setting screen 50 displays input boxes 58A and 58B for the user to input the first stroke amount S1 and the second stroke amount S2. When the user inputs desired values to the input boxes 58A and 58B and presses the setting completion button 60, the controller 22 changes the first stroke amount S1 of the button 34 necessary for the autofocus operation and the second stroke amount S2 necessary for the imaging operation to input values. Specifically, the controller 22 changes the first output value V1 being a trigger of the autofocus operation and the second output value V2 being a trigger of the imaging operation to values corresponding to the input values input to the input boxes 58A and 58B, respectively.

According to this stroke amount setting screen 50, the user can easily adjust the first stroke amount S1 and the second stroke amount S2 to desired stroke amounts while actually pressing the button 34, that is, while checking the load on the finger.

For example, in the case of photographing a moving subject, when the first stroke amount S1 is made substantially equal to the predetermined stroke amount Sd and the difference between the first stroke amount S1 and the second stroke amount S2 is reduced, the user can focus on the subject to immediately capture an image of the subject. In addition, in a case of photographing a stationary subject, when the difference between the first stroke amount S1 and the second stroke amount S2 is increased, the user can take time and adjust the composition of the subject in a focused state.

It should be noted that the imaging apparatus 10 may include a plurality of custom buttons to which setting values of the first and second stroke amounts S1 and S2 can be assigned. Thus, the user can change the first and second stroke amounts S1 and S2 in a short time by simply pressing the custom buttons without calling the stroke amount setting screen 50.

According to the present embodiment as described above, in the release switch device used in the imaging apparatus and including a button pressed and displaced by the user, it is possible to achieve a configuration in which the user can easily adjust the stroke amount of the button necessary for executing various operations.

Specifically, the first stroke amount S1 and the second stroke amount S2 can be adjusted without changing the structure of the release switch device 30 simply by changing the setting of the first output value V1 of the pressure-sensitive sensor 38 corresponding to the first stroke amount S1 and the second output value V2 corresponding to the second stroke amount S2.

As described above, although the embodiments of the present disclosure have been described by exemplifying the above-described embodiment, the embodiments of the present disclosure are not limited to the above-described embodiment.

For example, in the case of the above-described embodiment, as shown in FIG. 8, the first elastic member 36 and the second elastic member 40 are leaf springs. However, the embodiments of the present disclosure are not limited thereto. At least one of the first elastic member and the second elastic member may be a coil spring.

In addition, in the case of the above-described embodiment, the autofocus operation is executed when the button 34 is displaced by the first stroke amount S1, and the imaging operation is executed when the button 34 is displaced by the second stroke amount S2. The operation of the imaging apparatus executed based on the stroke amount of the button is not limited to the autofocus operation or the imaging operation. For example, an automatic exposure operation may be executed based on the stroke amount of the button of the release switch device.

That is, in a broad sense, the release switch device according to the embodiment of the present disclosure includes: a button configured to be pressed and displaced by a user; a first elastic member including a first displacement portion configured to be pressed and displaced by the button; a pressure-sensitive sensor configured to face the first displacement portion of the first elastic member at an interval, the pressure-sensitive sensor configured to be pressed and displaced by the button with interposition of the first elastic member, when the button is displaced exceeding a predetermined stroke amount; and a second elastic member including a second displacement portion configured to be pressed and displaced by the button with interposition of the first elastic member and the pressure-sensitive sensor. When the button is displaced by a first stroke amount equal to or larger than the predetermined stroke amount, the pressure-sensitive sensor receives a first repulsive force from the second elastic member and outputs a first output value. When the button is displaced by a second stroke amount larger than the first stroke amount, the pressure-sensitive sensor receives a second repulsive force larger than the first repulsive force from the second elastic member and outputs a second output value.

As described above, the above-described embodiment has been described as the exemplification of the technique in the present disclosure. To that end, drawings and a detailed description are provided. Therefore, among the components described in the drawings and the detailed description, not only the components essential for solving the problem, but also the components not essential for solving the problem may be included in order to exemplify the above technique. Therefore, it should not be recognized that these non-essential components are essential immediately because these non-essential components are described in the drawings and the detailed description.

In addition, since the above embodiment is for exemplifying the technique in the present disclosure, various changes, substitutions, additions, omissions, and the like can be made within the scope of the claims or the equivalent thereof.

The present disclosure is applicable to an imaging apparatus including a release switch device.

What is claimed is:

1. A release switch device comprising: a button configured to be pressed and displaced by a user; a first elastic member including a first displacement portion configured to be pressed and displaced by the button; a pressure-sensitive sensor configured to face the first displacement portion of the first elastic member at an interval, the pressure-sensitive sensor configured to be pressed and displaced by the button with interposition of the first elastic member, when the button is displaced exceeding a predetermined stroke amount; and a second elastic member including a second displacement portion configured to be pressed and displaced by the button with interposition of the first elastic member and the pressure-sensitive sensor, wherein when the button is displaced by a first stroke amount equal to or larger than the predetermined stroke amount, the pressure-sensitive sensor receives a first repulsive force from the second elastic member and outputs a first output value, and when the button is displaced by a second stroke amount larger than the first stroke amount, the pressure-sensitive sensor receives a second repulsive force larger than the first repulsive force from the second elastic member and outputs a second output value, wherein the first elastic member is a leaf spring including a free end as the first displacement portion, and the second elastic member is a leaf spring including a free end as the second displacement portion.

2. The release switch device according to claim 1, wherein the second elastic member is a spiral leaf spring, and includes a center side end as the second displacement portion.

3. The release switch device according to claim 1, further comprising a guide member configured to guide the pressure-sensitive sensor so that the pressure-sensitive sensor moves in parallel in the button displacement direction.

4. The release switch device according to claim 1, further comprising:
a board configured to be urged toward the first elastic member by the second elastic member, the board on which the pressure-sensitive sensor is mounted; and
a stopper member configured to come into contact with the board urged by the second elastic member to limit displacement of the pressure-sensitive sensor toward the first elastic member.

5. An imaging apparatus comprising:
the release switch device according to claim 1;
a lens;
an imaging element on which an image of a subject transmitted through the lens is formed; and
an AF mechanism configured to drive the lens in an optical axis direction to focus a subject on the imaging element,
wherein the AF mechanism executes an autofocus operation of focusing a subject on the imaging element with the first output value of the pressure-sensitive sensor as a trigger, and
the imaging element executes an imaging operation of creating image data on a subject with the second output value of the pressure-sensitive sensor as a trigger.

6. The imaging apparatus according to claim 5, further comprising a user interface unit for a user to change settings of the first output value being a trigger for executing the autofocus operation and the second output value being a trigger for executing the imaging operation.

* * * * *